(12) United States Patent
Li

(10) Patent No.: US 9,521,239 B2
(45) Date of Patent: Dec. 13, 2016

(54) APPARATUS AND METHOD FOR AUTOMATIC DISCOVERY AND SUGGESTING PERSONALIZED GESTURE CONTROL BASED ON USER'S HABIT AND CONTEXT

(71) Applicant: Samsung Electronics Co., Ltd., Suwon-si, Gyeonggi-do (KR)

(72) Inventor: Zhiyun Li, Kenmore, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 14/260,922

(22) Filed: Apr. 24, 2014

(65) Prior Publication Data
US 2015/0312398 A1    Oct. 29, 2015

(51) Int. Cl.
| H04M 3/00 | (2006.01) |
| H04M 1/725 | (2006.01) |
| H04M 11/00 | (2006.01) |
| H04W 4/02 | (2009.01) |

(52) U.S. Cl.
CPC ....... *H04M 1/72533* (2013.01); *H04M 11/007* (2013.01); *H04W 4/025* (2013.01)

(58) Field of Classification Search
CPC . H04M 1/72533; H04M 11/007; H04W 4/025
USPC ........................................................ 455/420
See application file for complete search history.

(56) References Cited

U.S. PATENT DOCUMENTS

| 2011/0093820 | A1 | 4/2011 | Zhang et al. | |
| 2013/0218053 | A1* | 8/2013 | Kaiser | A61B 5/1123 600/595 |
| 2015/0025790 | A1* | 1/2015 | Hwang | G08B 25/10 701/411 |
| 2015/0193193 | A1* | 7/2015 | Khaira | G06F 3/167 381/109 |

* cited by examiner

*Primary Examiner* — Shahriar Behnamian
(74) *Attorney, Agent, or Firm* — Jefferson IP Law, LLP

(57) ABSTRACT

An apparatus and method for automatic discovery and suggesting personalized gestures from mobile terminal to control a plurality of devices in smart home system, based on user's habit and context. The method includes recording, via a mobile terminal, a context of the mobile terminal, recoding, via home system, actions taken by the plurality of devices in the home system, recognizing as a gesture command from a correlation of at least a portion of the recorded context of the user's mobile terminal with the recorded actions taken by the plurality of devices in the home system, and controlling at least one of the plurality of devices based a repetition of the gesture command, the controlling repeating the actions taken by the at least one of the plurality of devices in the home system.

15 Claims, 7 Drawing Sheets

APPARATUS AND METHOD FOR AUTOMATIC DISCOVERY AND SUGGESTING PERSONALIZED GESTURE CONTROL BASED ON USER'S HABIT AND CONTEXT

TECHNICAL FIELD

The present disclosure relates to an apparatus and method for automatic discovery and suggesting personalized gesture control based on a user's habit and context. More particularly, the present disclosure relates to an apparatus and method for integrated discovery and control of a plurality of devices based upon a user's movements and gestures (i.e., context).

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, a GPS function, a motion detection function and many more. With the plurality of features now provided, a mobile terminal has effectively become a necessity of daily life.

The mobile terminals having become a necessity of daily life, the mobile terminals are kept with an individual as they perform their daily tasks. For example, a user of a mobile terminal may walk from work to home every day at 5:00 PM with their mobile terminal held in their hand. They walk down the street that they live on, the user turns left and walks up a short walkway, proceeds up three steps and stops for a moment, retrieves their keys, inserts the key in a lock, opens the door to their home and enters the home. During this period the user may be using the mobile terminal for a call function or the user may consider the phone to be in a dormant state.

The mobile terminal's user may additionally have a home system. The home system may monitor and/or control devices found in the user's home. For example, the home system may record that the user of the mobile terminal opens their front door shortly after 5:00 PM each day.

Accordingly, an apparatus and a method thereof that records the movements and actions of a user of a mobile terminal and uses that information to interface with other systems that the mobile terminal may interface with is desired.

SUMMARY

Aspects of the present disclosure are to address at least the above-mentioned problems and/or disadvantages and to provide at least the advantages described below. Accordingly, an aspect of the present disclosure is to provide an apparatus and method for integrated discovery and control of a plurality of devices based upon a user's movements and gestures.

In accordance with an aspect of the present disclosure, a method for integrated discovery and control of a plurality of devices based on movement, context and/or gesture is provided. The method includes recording, via a mobile terminal, context of a user of the mobile terminal, recoding, via home system, actions taken by the plurality of devices in the home system, recognizing as a gesture command from a correlation of at least a portion of the recorded context of the user of the mobile terminal with the recorded actions taken by the plurality of devices in the home system, confirming an action based on the correlation of the recorded patterns of the user of the mobile terminal with the recorded actions taken by the plurality of devices in the home system, and controlling at least one of the plurality of devices based on repetition of the gesture command, the controlling repeating the actions taken by the at least one of the plurality of devices in the home system.

In accordance with another aspect of the present disclosure, an apparatus for integrated discovery and control of a plurality of devices based on movement and/or gesture is provided. The apparatus includes a mobile device recording unit configured to record a context of a user of the mobile terminal, a home system recoding unit configured to record actions taken by the plurality of devices in the home system, and a controller configured to recognize as a gesture command from a correlation of at least a portion of the recorded context of the user of the mobile terminal with the recorded actions taken by the at least one of the plurality of devices in the home system, and to control at least one of the plurality of devices based on repetition of the gesture command, the controlling repeating the actions taken by the at least one of the plurality of devices in the home system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

DETAILED DESCRIPTION

Figure 1:
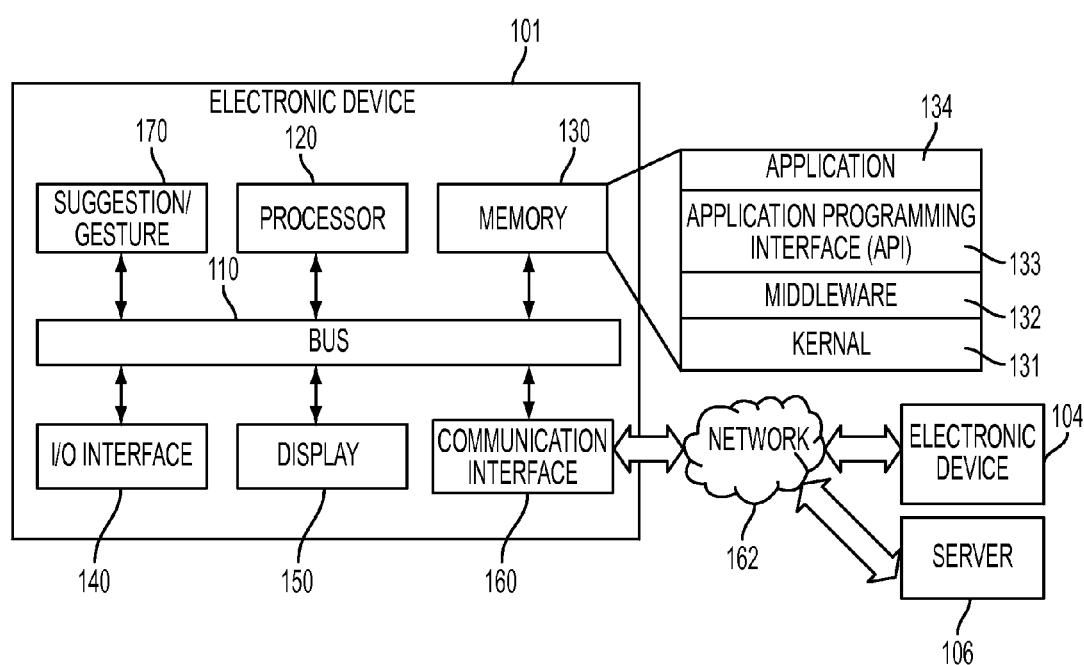
FIG. 1 illustrates a network environment including an electronic device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for integrated discovery and control of a plurality of devices based upon a user's movements and gestures.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, a suggestion/gesture module 170, and/or the like.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the suggestion/gesture module 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the suggestion/gesture module 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of electronic device 101.

The middleware 132 may be a medium through which the kernel 131 may communicate with the API 133, the application 134, and/or the like to send and receive data. The middleware 132 may control (e.g., scheduling, load balancing, and/or the like) work requests by one or more applications 134. For example, the middleware 132 may control work requests by one or more applications 134 by assigning priorities for using system resources (e.g., the bus 110, the processor 120, the memory 130, and/or the like) of electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

As an example, the notification relay application may include a functionality that provides notification generated by other applications at electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, as an example, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the suggestion/gesture module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the suggestion/gesture module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between electronic device 101 and an external electronic device may be supported by, for example, at least one of the application 134, the API 133, the middleware 132, the kernel 131, the communication interface 160, and/or the like.

Figure 4:
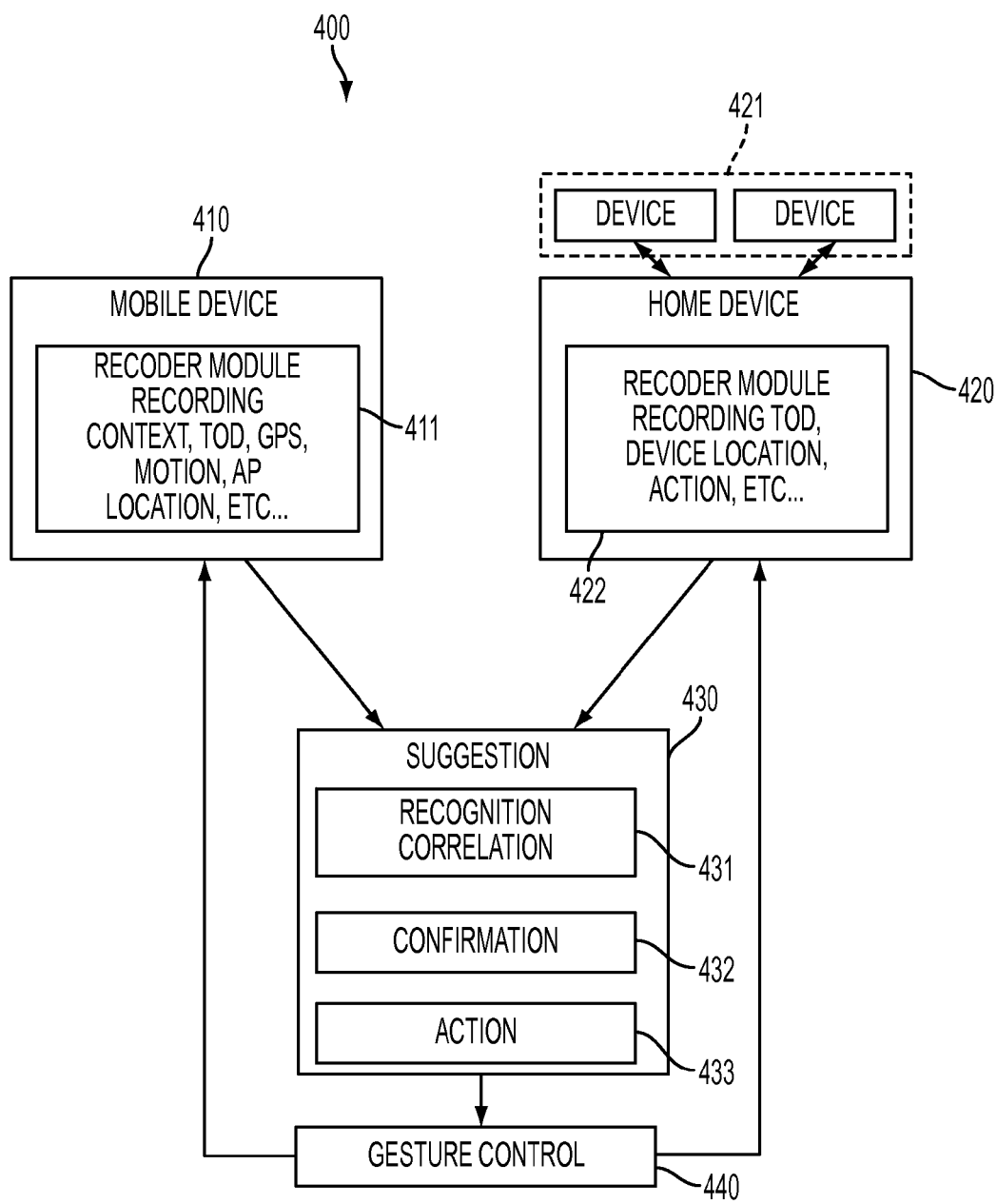
FIG. 4 illustrates a simplified configuration of a home network system that is capable of connecting with a mobile terminal according to an embodiment of the present disclosure.

The suggestion/gesture module 170 may, for example, process at least a part of information received from other components (e.g., the processor 120, the memory 130, the I/O interface 140, the communication interface 160, and/or the like), and provide various information, services, and/or the like to the user in various manners. For example, the suggestion/gesture module 170 may control via the processor 120 or independently at least some of the functions of the electronic device 101 to communicate or connect to another electronic device (e.g., the electronic device 104, the server 106, and/or the like). FIG. 4 will provide additional information regarding the suggestion/gesture module 170.

Figure 2:
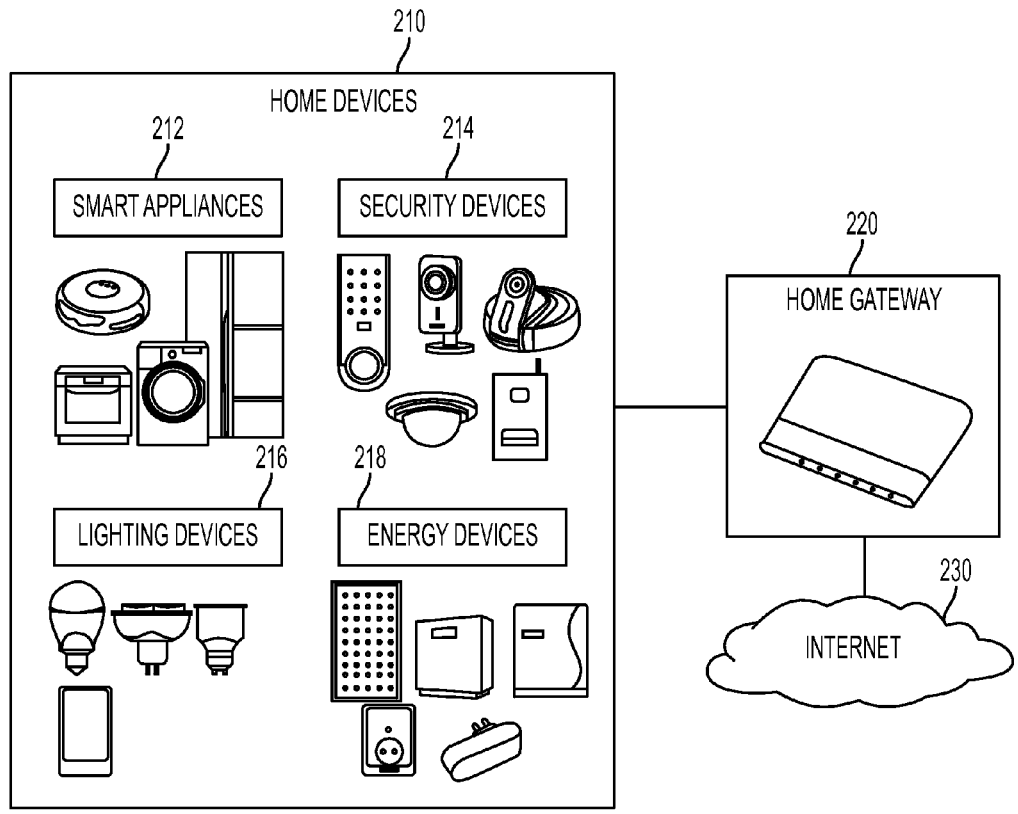
FIG. 2 illustrates a simplified structure of a home network system according to an embodiment of the present disclosure.

FIG. 2 illustrates a simplified structure of a home network system according to an embodiment of the present disclosure.

Referring to FIG. 2, a home network system is configured to include home devices 210 having a control and communication function and a Home GateWay (HGW) 220. The home devices 210 are located inside (or outside) a house, and include smart appliances 212, security devices 214, lighting devices 216, energy devices 218, and the like. For example, the smart appliances 312 correspond to a Television (TV), an air-conditioner, a refrigerator, a washing machine, a robot-cleaner, a humidifier, and the like. The security devices 214 correspond to a door-lock, a security camera, a Closed Circuit Television (CCTV), and a security sensor that senses a contact, a sound, a movement, and the like, the lighting devices 216 correspond to a Light Emitting Diode (LED), a lamp, and the like, and the energy devices 318 may correspond to a heater, a power meter, a power socket, an electrical outlet, a multiple-tap, and the like. In addition, the home devices 210 may include a Personal Computer (PC), an IP camera, an Internet phone, a wired/wireless phone, a mobile phone used in a home, a curtain or blind that may be electrically controlled, and the like.

The home devices 210 may be capable of performing communication with the home gateway 220 according to a wired or wireless communication scheme, and may be configured to receive a control command from the home gateway 120, to operate based on the control command, and to transmit requested information and/or data to the home gateway 220.

The home gateway 220 may be embodied as an independent apparatus, or an apparatus equipped with a home gateway function. For example, the home gateway 120 may be embodied as a television, a cellular phone, a tablet computer, a set-top box, a robot cleaner, or a personal computer. The home gateway 220 may be equipped with corresponding communication modules for performing communication with the home devices 210 based on a wired or wireless communication scheme, so as to register and store information associated with the home devices 210, to manage and control operations, supportable functions, and states of the home devices 210, and to collect and store required information from the home devices 210. Particularly, the home gateway 220 may be connected with a data network such as the Internet, that is, an IP network 230, and allows a connection by a communication terminal through the Internet 230 and transfers a control signal received from the communication terminal to a corresponding home device. Also, the home gateway 220 may communicate with the communication terminal using a wireless communication scheme such as WiFi (Wireless Fidelity), Zigbee, Bluetooth, an NFC (Near Field Communication), and z-wave.

The home network system configured as described above may provide a home entertainment service, such as an Internet TV (IPTV) through the Internet 230, a Video on Demand (VoD) and the like, a home data communication service such as data sharing, Voice over IP (VoIP), a video phone, and the like, and a home automation service such as remote control of an electrical appliance, a remote meter reading, crime prevention, disaster prevention and the like. That is, the home network system may connect all types of home devices used inside and outside a house through a single network for a control.

Meanwhile, a user may connect with a home gateway included in the home network system from the outside of the house using a communication terminal such as a mobile terminal, or may remotely connect with each home device through the home gateway. The mobile terminal may be, for example, a Personal Digital Assistant (PDA) including a communication function, a Smart Phone, a feature phone, a tablet Personal Computer (PC), a notebook and the like, and may access a home network system directly or through a provider's network and the Internet.

Figure 3:
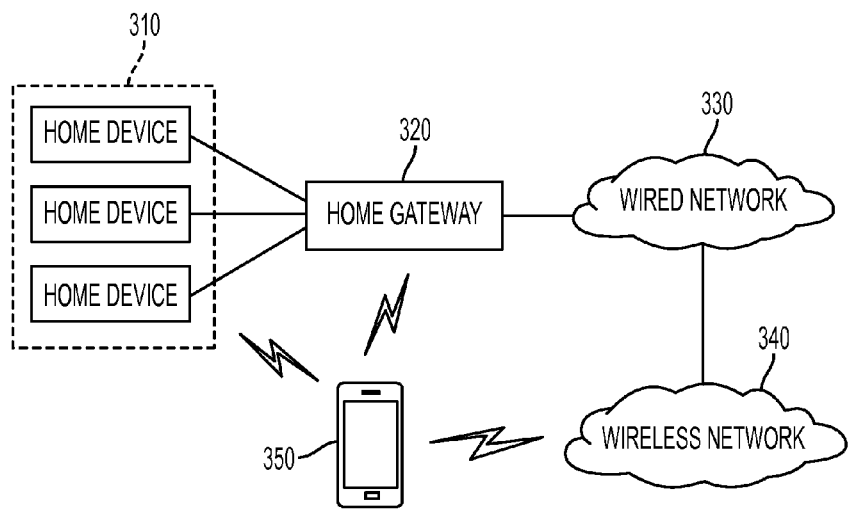
FIG. 3 illustrates a simplified configuration of a home network system that is capable of connecting with a mobile terminal according to an embodiment of the present disclosure.

FIG. 3 illustrates a simplified configuration of a home network system that is capable of connecting with a mobile terminal according to an embodiment of the present disclosure.

Referring to FIG. 3, the home devices 310 in the home network system connects with the home gateway 320 through a wired or wireless communication scheme. The home gateway 320 may connect with a wired network 330 such as the Internet. A registered mobile terminal 350 may connect with a wireless network 340 including a wireless access network and a provider core network, and may access the home gateway 420 through the wired network 330. A wireless network 340 may be a 2nd Generation (2G) or 3G cellular communication system, 3rd Generation Partnership Project (3GPP), a 4G communication system, Long-Term Evolution (LTE), World Interoperability for Microwave Access (WiMAX), and the like. Also, the mobile terminal 350 may directly communicate with the home gateway 420 using a wireless communication scheme such as WiFi, Zigbee, Bluetooth, an NFC, and z-wave. The mobile terminal 350 may directly communicate with the home devices 310 via NFC, Bluetooth, and the like.

FIG. 4 illustrates a conceptual diagram of a system according to various embodiments of the present disclosure.

Referring to FIG. 4 a system 400 includes a mobile device 410, a home network 420, a suggestion module 430 and a gesture control module 440.

The mobile device 410 contains a movement recording module 411 that records the context, movement and/or motions of the electronic device 400. That is, the recoding module records information received from a motion sensor (not illustrated), a Global Positioning System (GPS) (not illustrated), information of a wireless Access Point (AP) with which the mobile device 410 has established a communication connection.

For example, the motion sensor, the GPS and the information of the wireless AP are separately used by different functions of the electronic device. The movement recording module 411 uses the information received from these devices to ascertain the mobile devices movements throughout a period of time. For example, between 5:00 PM and 5:30 PM each week day a user holding the mobile device 410 leaves his office and walks three blocks north on Main Street and then turns left onto Sycamore Street, and walks half a block to his home. Upon reaching his home, the user turns left and walks to the front steps of the house where he or she proceeds up the steps, the user pauses, reaches for his or her keys, inserts the keys in the door, opens the door, and proceeds into his or her house.

Each of these movements is received by various elements of the mobile device 410. As the user walks from his office, the recording module receives information from the GPS as to the user's location. The information from the GPS is the coordinates, such as longitude and latitude, which the user walks along on their path to home. These coordinates are stored in a series along with a timestamp. It will be understood that the information as to movement is not limited to information received from a GPS, and other information such as the location of wireless APs and cell tower triangulation may be used to determine location. Further, a motion sensor of the mobile device 410 may record the movement of the user when moving in any direction, for example, vertically, that a GPS cannot distinguish or when the movement along a two-dimensional plane is with the margin of error of the GPS system. For example, proceeding up the front steps of the user's home may not register as movement to the GPS, but the motion sensor or other sensor may register the change in distance to nearby objects or altitude, and the like.

These movements are recorded as a context or pattern for later retrieval by the recording module 411 of the mobile device 410.

The home system 420 is responsible for monitoring and/or controlling devices 421. One of the devices 421 maybe a door locking device (not illustrated) that monitors the state of the door, the state of the lock of the door and also controls the lock mechanism. For example, the home system 120 may upon determining that the door locking mechanism is in an unlocked position after 11:00 PM in the evening, cause the door locking mechanism to lock by driving a signal that causes a motor (not illustrated) to actuate the locking mechanism into a locked state.

The home system 420 may include a home system recording module 422 that records the change of state of the device 421. In our example above, the user would arrive home after a ten minute walk between 5:10 PM and 5:40 PM. After waking up the steps and pausing, he would insert his keys in the door lock and open the door. The home system recording module 422 records the change in state of the door locking mechanism and the door and the time the state change occurs.

The suggestion module 430 receives information recorded by the both the movement recording module 411 and the home system recording module 422. The suggestion module 430 is illustrated as a separate from each of the movement recording module 411 and the home system recording module 422. For example, the suggestion module 430 may be implemented in a client server architecture (not illustrated) where a server performs the functions of the suggestion module 430. However, it will be understood that the suggestion module 430 and the constituent parts of recognition/correlation module 431, confirmation module 432 and action module 433 may be implemented in a peer-to-peer architecture (not illustrated) where both the mobile device 410 and the home system 420 each shares a portion of the functions of the suggestion module 430. Thus, the suggestion/gesture module 170 may be implemented across a number of different devices and is not limited to the embodiment found in FIG. 1

The suggestion module 430 upon receiving the recorded patters from the mobile terminal 410 and the actions taken by the home system correlates 431 the information received based upon time and location using a pattern classifier. It will be understood that the correlation is not limited to time and location, but may include micro movements registered by sensors other than a GPS, for example, an accelerometer 840E (see FIG. 8), within a location that indication a particular action to be taken.

The recognition/correlation module 431 having recognized a gesture or pattern recorded by the mobile device 410 and the home system 430, confirms 432 with the user of the mobile device 110 that a gesture command is an action that user wishes to take. For example, after correlating the user walking from his or her office each weekday between 5:00 PM and 5:30 PM and arriving at the front door of the home between 5:10 PM and 5:40 PM, the door controlled by the home system 420, the user pauses and enters his or her key to unlock the door and enters the home. The confirmation module 432 inquires via a display of the mobile device 410 whether in the future the user wishes the door to be automatically unlocked when this context or pattern is repeated as a gesture command. The user upon confirming the gesture command has the action 433 recorded for future use.

The next day the recorder module 411 records the user walking from his or her office between 5:00 PM and 5:30 PM and arriving at the front door of the home between 5:10 PM and 5:40 PM, pausing after walking up several steps. The gesture control module 440 aware of the previously confirmed and stored action recognizes the gesture command and informs the home system 420 to unlock the door of the home and the user may enter without use of the key. It will be understood that while an action of unlocking a front door of a house has been illustrated, the system is not so limited and any device capable of being monitored and controlled may be so controlled.

Figure 5:
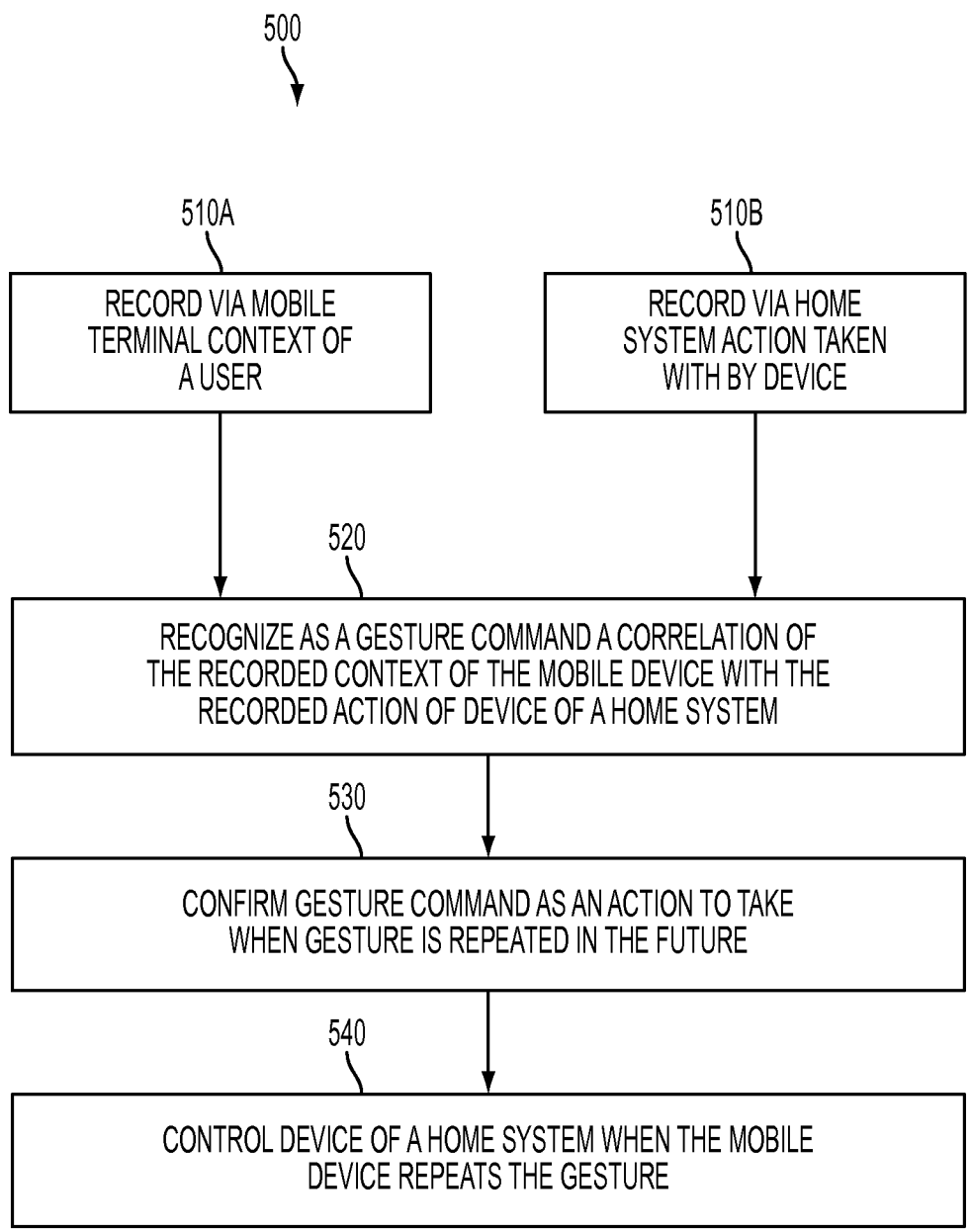
FIG. 5 illustrates a method integrated discovery and control of a plurality of devices based upon a user's movements and gestures according to an embodiment of the present disclosure.

FIG. 5 illustrates a method of an embodiment of the present disclosure.

Referring to FIG. 5, the method 500 for integrated discovery and control of a plurality of devices is illustrated.

At operation 510A the mobile terminal 410 may record a context or patterns of a user of the mobile terminal. The recording of the patterns of the user of the mobile terminal include recording at least a time and a physical movement of the mobile terminal. The physical movement of the mobile terminal is determined via at least a GPS. However, movement of the mobile terminal 410 may be determined by other sensors of the mobile device 410.

At operation 510B, in parallel with operation 510A, the home system 420 may record context or actions taken by the plurality of devices 421 in the home system. The recording of the actions of the devices 421 of the home system 420 includes recording the time of the action and the location of the device 421.

At operation 520 recognize as a gesture command a recognition/correlation module 431 of a suggestion module 430 may correlate the recorded patterns of the user of the mobile terminal 410 with the recorded actions taken by the plurality of devices 421 in the home system 420. The correlating 520 of the recorded patterns of the user of the mobile terminal 410 with the recorded actions taken by the plurality of devices 421 in the home system 420 in proximity with the physical movements of the mobile terminal 410 and matching a time of an action taken by the one of the plurality of devices 421 in the home system 420 with a time of the physical movements of the mobile terminal 410.

Optionally, determine a location of one of the plurality of devices 421 in the home system 420 in proximity with the physical movements of the mobile terminal 410 and the matching of the time of the action taken by the one of the plurality of devices 421 in the home system 420 with a time of the physical movements of the mobile terminal 410 repeats at least a threshold value number of times. The threshold value may be predetermined or set by a user.

The physical movements of the mobile terminal 410 include a series of distinct physical movements of the mobile terminal 410 from one location in a three-dimensional plane to another location in a three-dimensional plane. Thus, the mobile terminal 410 does not only include latitude and longitude, but also vertical movement of the user. The number of the distinct movements in the series should be greater than a threshold value that is predetermined or set by the user.

At operation 530 the confirming module 432 may confirm an action based on the correlation of the recorded patterns of the user of the mobile terminal 410 with the recorded actions taken by the plurality of devices 421 in the home system 420. The confirming of the action based on the correlation of the recorded patterns of the user of the mobile terminal 410 with the recorded actions taken by the plurality of devices 421 in the home system 420 includes displaying an action taken when the recorded patterns of the user of the mobile terminal 410 repeat, and receiving the user's acknowledgement to take the action when the recorded patterns of the user of the mobile terminal 410 repeat. Once the action is confirmed the action module 433 may store the action for later retrieval. It will be understood that the user may not confirm the gesture command and the system may automatically set the gesture command based upon a heuristic confidence value with regard to the repetition of the context or gesture.

At operation 540 the gesture control module 440 may control the plurality of devices 421 based on the user's confirming of the action based on the correlation of the recorded patterns of the user of the mobile terminal 410 with the recorded actions taken by the plurality of devices 421 in the home system 420 and a repetition of the patterns of the user of the mobile terminal 410. The gesture control module 440 determines that the current patterns of a user of the mobile terminal 410 are the same as the recorded patterns, and that there is a confirmed action associated with the recorded patterns of the user of the mobile terminal 410 and based on that determination executes on one of the plurality of devices 421 in the home system 420 the action associated with the recorded patterns of the user of the mobile terminal 410.

Figure 6:
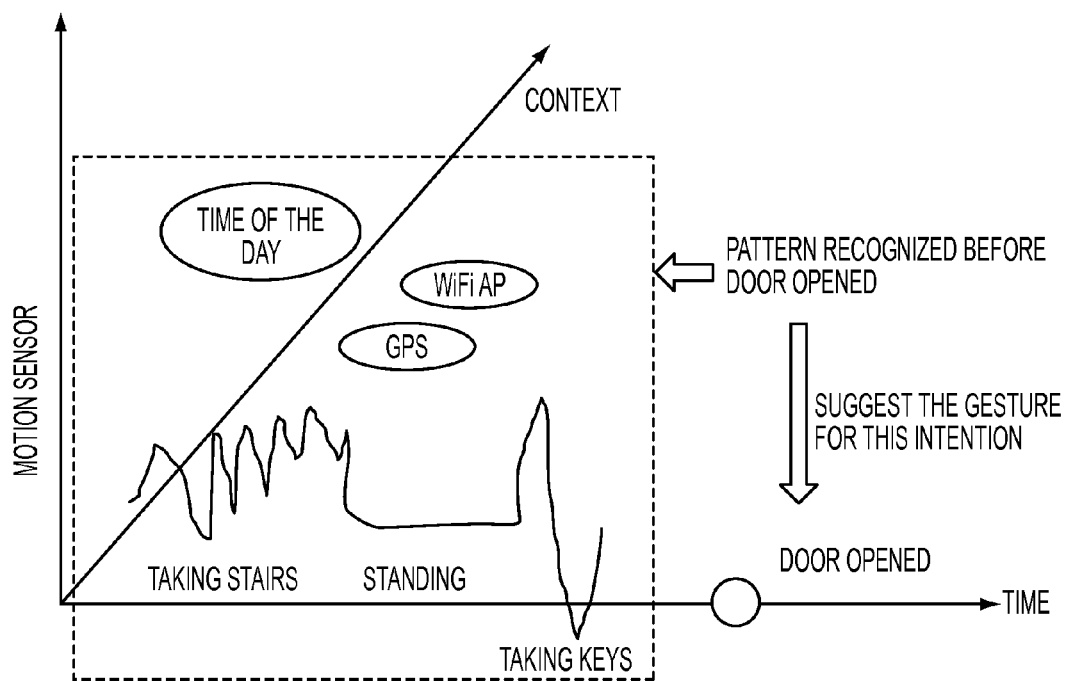
FIG. 6 illustrates a graph for pattern recognition and action suggestion according to various embodiments of the present disclosure.

FIG. 6 illustrates a graph for pattern recognition and action suggestion according to various embodiments of the present disclosure.

Referring to FIG. 6, a graph showing the amount of location and/or motion of a mobile device over time. The increase or repetition in location and/or movement of the mobile device and the action of a device in a home system increases the probability that a correlation between the location and/or movement of the mobile device and the action of a device in a home system is made.

Figure 7:
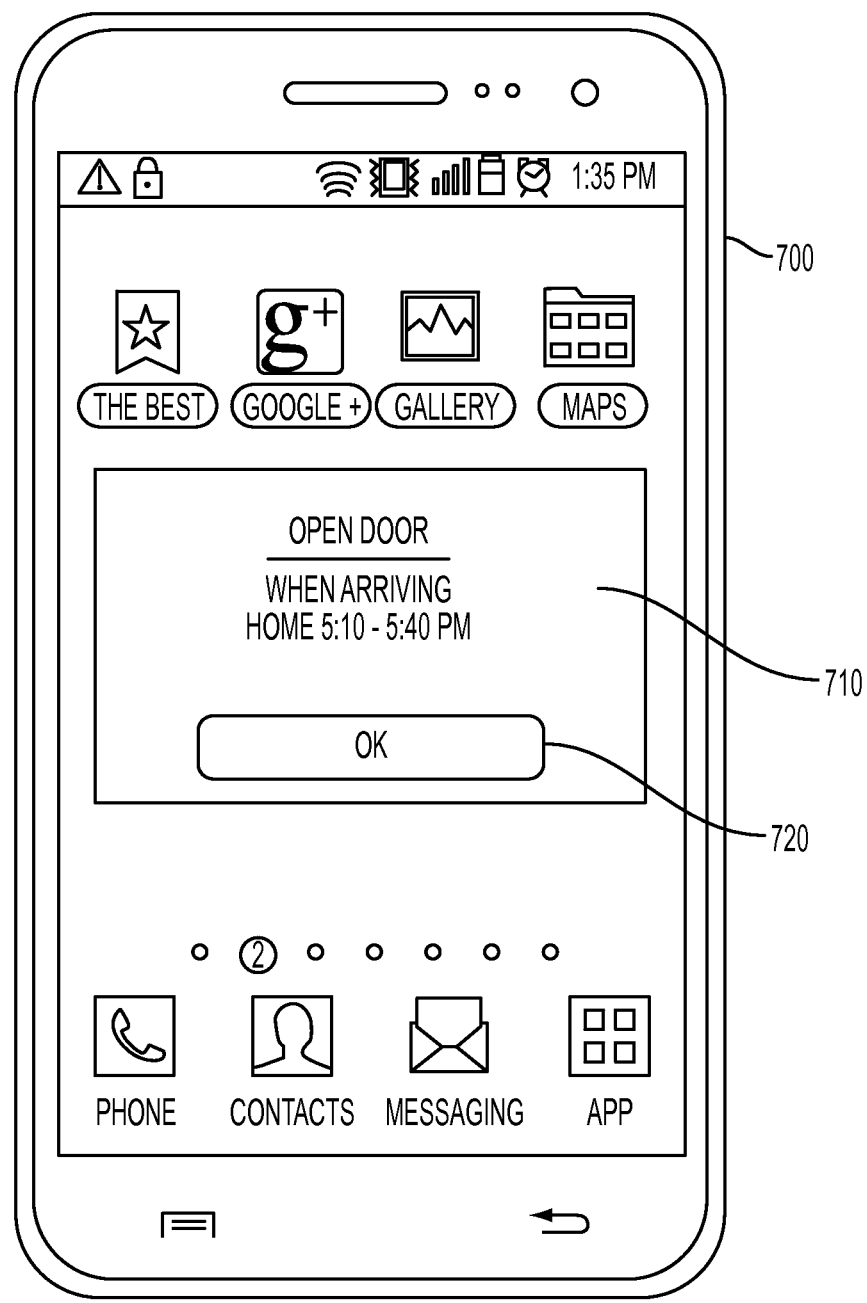
FIG. 7 illustrates a display of confirmation of an action by a mobile device according to embodiments of the present disclosure.

FIG. 7 illustrates a display of confirmation of an action by a mobile device according to embodiments of the present disclosure.

Referring to FIG. 7 a display 700 includes a confirmation menu 710. The confirmation menu requests the user to confirm a gesture command that upon a particular sequence of movements and/or gestures occurring, a particular action be taken in a home system. The confirmation button 720 upon being activated, confirms the action. Thereafter, whenever the pattern of movement/and or gesture repeats, the action will be executed in a device of the home system.

Figure 8:
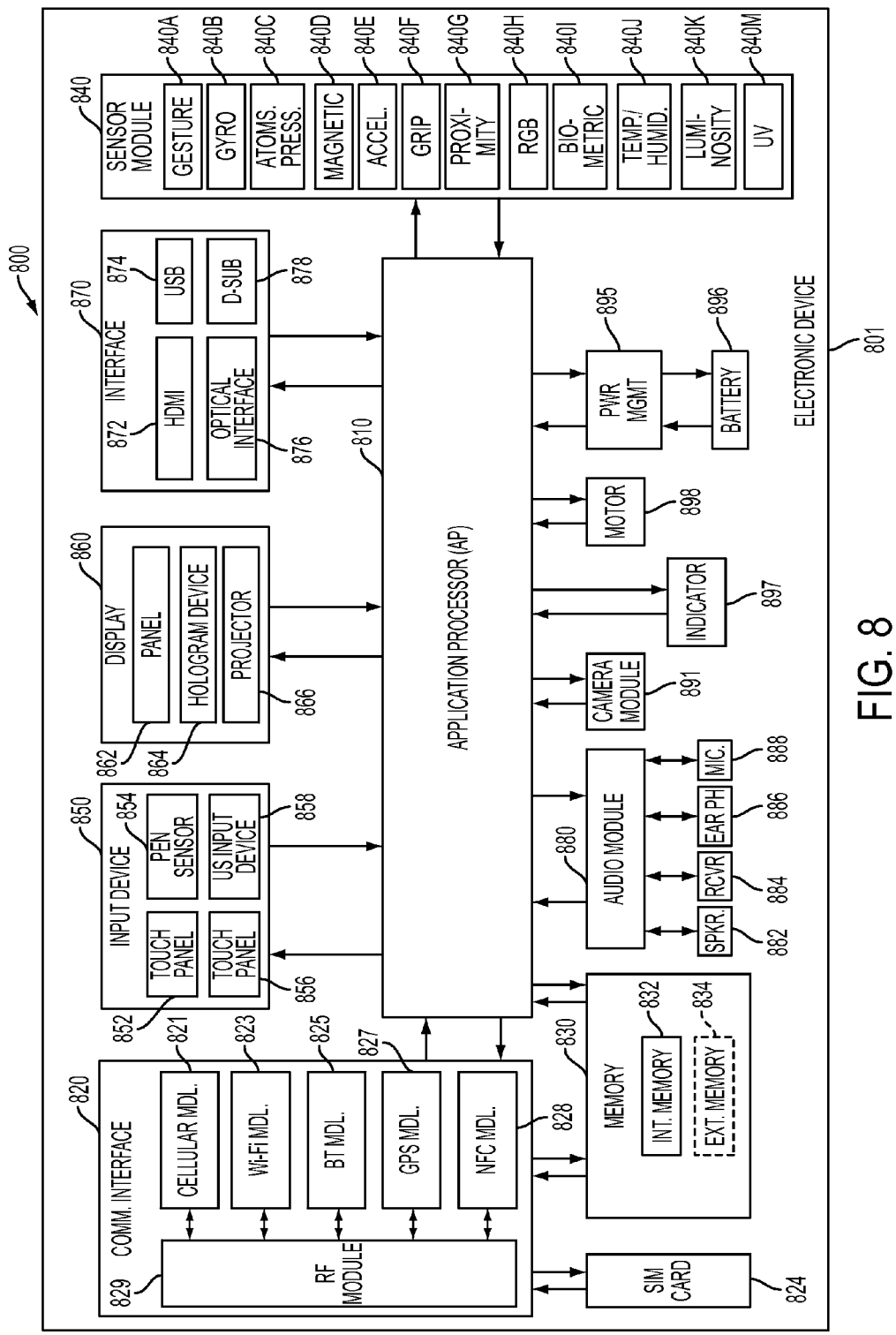
FIG. 8 illustrates a block diagram of hardware according to various embodiments of the present disclosure.

FIG. 8 illustrates a block diagram of hardware according to various embodiments of the present disclosure.

Referring to FIG. 8, hardware 801 may be, for example, a part or all of the electronic device 101. Referring to FIG. 8, the hardware 801 may include one or more Application Processors (AP) 810, a communication module 820, a Subscriber Identification Module (SIM) card 824, a memory 830, a sensor module 840, an input module 850, a display module 860, an interface 870, an audio module 880, a camera module 891, a power management module 895, a battery 896, an indicator 897, a motor 898, and/or the like.

The AP 810 may control one or more hardware or software components that are connected to AP 810, perform processing or computation of data (including multimedia data), and/or the like. As an example, the AP 810 may be implemented as a System-on-Chip (SoC). The AP 810 may include a Graphics Processing Unit (GPU) (not shown).

The communication module 820 (e.g., the communication interface 160) may transmit and receive data in communications between the electronic device 101 and other electronic devices (e.g., the electronic device 104, the server 106, and/or the like). As an example, the communication module 820 may include one or more of a cellular module 821, a Wi-Fi module 823, a Bluetooth module 825, a GPS module 827, a NFC module 828, a Radio Frequency (RF) module 829, and/or the like.

The cellular module 821 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). As an example, the cellular module 821 may differentiate and authorize electronic devices within a communication network using a Subscriber Identification Module (SIM) card (e.g., the SIM card 824). According to various embodiments of the present disclosure, the cellular module 821 may perform at least a part of the functionalities of the AP 810. For example, the cellular module 821 may perform at least a part of multimedia control functionality.

According to various embodiments of the present disclosure, the communication interface 820 and/or the cellular module 821 may include a Communication Processor (CP). As an example, the cellular module 821 may be implemented as SoC.

Although FIG. 8 illustrates components such as the cellular module 821 (e.g., CP), the memory 830, the power management module 895 as components that are separate from the AP 810, according to various embodiments of the present disclosure, the AP 810 may include, or be integrated with, one or more of the foregoing components (e.g., the cellular module 821).

According to various embodiments of the present disclosure, the AP 810, the cellular module 821 (e.g., CP), and/or the like, may process instructions or data received from at least one of non-volatile memory or other components by loading in volatile memory. The AP 810, the cellular module 821, the communication interface 820, and/or the like, may store at non-volatile memory at least one of data that is received from at least one of other components or data that is generated by at least one of the other components.

Each of the Wi-Fi module 823, the Bluetooth module 825, the GPS module 827, the NFC module 828, and/or the like may, for example, include one or more processors that may process data received or transmitted by the respective modules. Although FIG. 8 illustrates the cellular module 821, the Wi-Fi module 823, the Bluetooth module 825, the GPS module 827, and the NFC module 828 as separate blocks, according to various embodiments of the present disclosure, any combination (e.g., two or more) of the cellular module 821, the Wi-Fi module 823, the Bluetooth module 825, the GPS module 827, the NFC module 828, and/or the like may be included in an Integrated Chip (IC) or an IC package. For example, at least some of the processors corresponding to the respective the cellular module 821, the Wi-Fi module 823, the Bluetooth module 825, the GPS module 827, the NFC module 828, and/or the like, may be implemented as a single SoC. For example, a CP corresponding to the cellular module 821 and a Wi-Fi processor corresponding to Wi-Fi module 823 may be implemented as a single SoC.

The RF module 829 may, for example, transmit and receive RF signals. Although not shown, the RF module 829 may include a transceiver, a Power Amp Module (PAM), a frequency filter, a Low Noise Amplifier (LNA), and/or the like. The RF module 834 may include one or more components for transmitting and receiving Electro-Magnetic (EM) waves (e.g., in free space or the like) such as, for example, conductors or conductive wires. Although FIG. 8 illustrates that the cellular module 821, the Wi-Fi module 823, the Bluetooth module 825, the GPS module 827, and the NFC module 828 are sharing one RF module 829, according to various embodiments of the present disclosure, at least one of the cellular module 821, the Wi-Fi module 823, the Bluetooth module 825, the GPS module 827, the NFC module 828, and/or the like may transmit and receive RF signals via a separate RF module.

The SIM card 824 may be a card implementing a SIM, and may be configured to be inserted into a slot disposed at a specified location of the electronic device. The SIM card 824 may include a unique identifier (e.g., Integrated Circuit Card IDentifier (ICCID)) subscriber information (e.g., International Mobile Subscriber Identity (IMSI)), and/or the like.

The memory 830 (e.g., memory 130) may include an internal memory 832, an external memory 834, or a combination thereof.

According to various embodiments of the present disclosure, the internal memory 832 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 832 may be a Solid State Drive (SSD). As an example, the external memory 834 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 834 may be operatively coupled to electronic device 801 via various interfaces. According to various embodiments of the present disclosure, the electronic device 801 may include recording devices (or recording media) such as, for example, Hard Disk Drives (HDD), and/or the like.

The sensor module 840 may measure physical/environmental properties detect operational states associated with electronic device 801, and/or the like, and convert the measured and/or detected information into signals such as, for example, electric signals or electromagnetic signals. As an example, the sensor module 840 may include at least one of a gesture sensor 840A, a gyro sensor 840B, an atmospheric pressure sensor 840C, a magnetic sensor 840D, an accelerometer 840E, a grip sensor 840F, a proximity sensor 840G, an RGB sensor 840H, a biometric sensor 840I, a temperature/humidity sensor 840J, a luminosity sensor 840K, a Ultra Violet (UV) sensor 840M, and/or the like. The sensor module 840 may detect the operation state of the electronic device and/or measure physical properties, and convert the detected or measured information into electrical signals. Additionally or alternatively, the sensor module 840 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 840 may also include control circuitry for controlling one or more sensors included therein. It will be understood that information of any of the above sensors may be used to determine the movements and/or gestures of a user of a mobile device 101 and the corresponding information user to correlate a pattern of movements/and or gestures to an action of the home system.

The input module 850 may include a touch panel 852, a (digital) pen sensor 854, a key 856, an ultrasonic input device 858, and/or the like.

As an example, the touch panel 852 may detect touch input using capacitive, resistive, infrared, ultrasonic methods, and/or the like. The touch panel 852 may also include a touch panel controller (not shown). As an example, a capacitive-type touch panel may detect proximity inputs (e.g. hovering input) in addition to, or as an alternative to, physical touch inputs. The touch panel 852 may also include a tactile layer. According to various embodiments of the present disclosure, the touch panel 852 may provide haptic feedback to the user using the tactile layer.

As an example, the (digital) pen sensor 854 may be implemented using methods identical to or similar to receiving a touch input from a user, or using a separate detection sheet (e.g., a digitizer).

As an example, the key 856 may be a keypad, a touch key, and/or the like.

As an example, the ultrasonic input device 858 may be a device configured to identify data by detecting, using a microphone (e.g., microphone 888), ultrasonic signals generated by a device capable of generating the ultrasonic signal. The ultrasonic input device 858 may detect data wirelessly.

According to various embodiments of the present disclosure, the electronic device 801 may receive user input from an external device (e.g., a network, computer or server) connected to the electronic device 801 using the communication module 820.

The display module 860 (e.g., display 150) may include a panel 862, a hologram device 864, a projector 866, and/or the like. As an example, the panel 862 may be, for example, a Liquid-Crystal Display (LCD), an Active-Matrix Organic Light-Emitting Diode (AM-OLED) display, and/or the like. As an example, the panel 862 may be configured to be flexible, transparent, and/or wearable. The panel 862 and the touch panel 852 may be implemented as a single module. The hologram device 864 may provide a three-dimensional image. For example, the hologram device 864 may utilize the interference of light waves to provide a three-dimensional image in empty space. The projector 866 may provide image by projecting light on a surface (e.g., a wall, a screen, and/or the like). As an example, the surface may be positioned internal or external to electronic device 801. According to various embodiments of the present disclosure, the display module 860 may also include a control circuitry for controlling the panel 862, the hologram device 864, the projector 866, and/or the like.

The interface 870 may include, for example, one or more interfaces for a High-Definition Multimedia Interface (HDMI) 872, a Universal Serial Bus (USB) 874, a projector 876, or a D-subminiature (D-sub) 878, and/or the like. As an example, the interface 870 may be part of the communication interface 820. Additionally or alternatively, the interface 870 may include, for example, one or more interfaces for Mobile High-definition Link (MHL), Secure Digital (SD)/MultiMedia Card (MMC), Infrared Data Association (IrDA), and/or the like.

The audio module 880 may encode/decode sound into electrical signal, and vice versa. According to various embodiments of the present disclosure, at least a portion of audio module 880 may be part of the I/O interface 140. As an example, the audio module 880 may encode/decode voice information that is input into, or output from, the speaker 882, the receiver 884, the earphone 886, the microphone 888, and/or the like.

The camera module 891 may capture still images and/or video. According to various embodiments of the present disclosure, the camera module 891 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 895 may manage electrical power of the electronic device 801. Although not shown, the power management module 895 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 801 may include wired or wireless charging. The charger IC may charge a battery, may prevent excessive voltage or excessive current from a charger from entering the electronic device 801, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 896, and/or the like.

As an example, the battery 896 may supply power to the electronic device 801. As an example, the battery 896 may be a rechargeable battery, a solar battery, and/or the like.

The indicator 897 may indicate one or more states (e.g., boot status, message status, charge status, and/or the like) of the electronic device 801 or a portion thereof (e.g., AP 810). Motor 898 may convert an electrical signal into a mechanical vibration.

Although not shown, the electronic device 801 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method for integrated discovery and control of a plurality of devices based on movement, context and/or gesture, the method comprising:
   recording, via a mobile terminal, a context of a user of the mobile terminal;
   recording, via home system, actions taken by the plurality of devices in the home system;
   recognizing as a gesture command from a correlation of at least a portion of the recorded context of the user of the mobile terminal with the recorded actions taken by the plurality of devices in the home system; and
   controlling at least one of the plurality of devices based on repetition of the gesture command, the controlling repeating the actions taken by the at least one of the plurality of devices in the home system, wherein the recorded context of the user of the mobile terminal includes macro movements recorded as a map movement and micro movements recorded as other movements of the user of the mobile terminal in relation to the user's external environment not recorded as the map movement.

2. The method of claim 1, further comprising:
suggesting the gesture command based on at least a portion of the recognition of the recorded context of the user of the mobile terminal with the recorded actions taken by the plurality of devices in the home system; and
confirming, in response to the suggesting of the gesture command, the gesture command, the gesture command enables the controlling of the at least one of the plurality of devices in the home system.

3. The method of claim 1, wherein the recording of the context of the user of the mobile terminal comprises recording at least a time, usage history and a physical movement of the mobile terminal.

4. The method of claim 3, wherein the physical movement of the mobile terminal is determined via at least one of a Global Position System (GPS), WIFI hotspot, cell tower triangulation and a motion sensor.

5. The method of claim 2, wherein the correlation of the recorded context of the user of the mobile terminal with the recorded actions taken by the plurality of devices in the home system comprises:
identifying the recorded actions taken by the at least one of the plurality of devices in the home system;
recognizing via a pattern classifier, a repeated pattern from the recorded context of the mobile terminal in correlation with a repeated pattern from the recorded actions taken by the at least one of the plurality of devices in the home system; and
matching, based on the pattern classifier, an action taken by the at least one of the plurality of devices in the home system with the recognized repeated pattern from the history recorded by the mobile terminal.

6. The method of claim 1, wherein the controlling of the at least one of the plurality of devices based on repetition of the gesture command, the controlling repeating the actions taken by the at least one of the plurality of devices in the home system comprises:
causing, when it is determined that a current context of a user of the mobile terminal are the same as the recorded context, and that the gesture command associated with the recorded patterns of the user of the mobile terminal, execution of an action associated with the gesture command of the user of the mobile terminal.

7. The method of claim 6, wherein the repeated context of the user of the mobile terminal is walking up a walk way to a home of the user, stepping up several steps and pausing at a top of the several steps, and
wherein the controlling of at least one of the plurality of devices based on the user's repeated context comprises automatically opening a door of the user's home by a home system in communication with the mobile device.

8. An apparatus for integrated discovery and control of a plurality of devices based on movement and/or gesture, the apparatus comprising:
a mobile device recording unit configured to record a context of a user of the mobile terminal;
a home system recoding unit configured to record actions taken by the plurality of devices in the home system; and
a controller configured to:
recognize as a gesture command from a correlation of at least a portion of the recorded context of the user of the mobile terminal with the recorded actions taken by the at least one of the plurality of devices in the home system, and
control at least one of the plurality of devices based on repetition of the gesture command, the controlling repeating the actions taken by the at least one of the plurality of devices in the home system,
wherein the recorded context of the user of the mobile terminal includes macro movements recorded as a map movement and micro movements recorded as other movements of the user of the mobile terminal in relation to the user's external environment not recorded as the map movement.

9. The apparatus of claim 8, further comprising:
a gesture unit configured to suggest the gesture command based on at least a portion of the recognition of the recorded context of the user of the mobile terminal with the recorded actions taken by the at least one of plurality of devices in the home system; and
a confirmation unit configured to confirm, in response to the suggesting of the gesture command, the gesture command, the gesture command enables the controlling of the at least one the plurality of devices in the home system.

10. The apparatus of claim 8, wherein mobile device recording unit records at least a time, usage history and a physical movement of the mobile terminal.

11. The apparatus of claim 10, wherein the physical movement of the mobile terminal is determined via at least one of a Global Position System (GPS), WIFI hotspot, cell tower triangulation and a motion sensor.

12. The apparatus of claim 9, wherein the controller correlating the recorded context of the user of the mobile terminal with the recorded actions taken by the plurality of devices in the home system comprises identifying the recorded actions taken by the at least one of the plurality of devices in the home system, recognizing via a pattern classifier, a repeated pattern from the recorded context of the mobile terminal in correlation with a repeated pattern from the recorded actions taken by the at least one of the plurality of devices in the home system, and matching, based on the pattern classifier, an action taken by the at least one of the plurality of devices in the home system with the recognized repeated pattern from the history recorded by the mobile terminal.

13. The apparatus of claim 8, wherein the controller controlling the at least one of the plurality of devices based on repetition of the gesture command, the controlling repeating the actions taken by the at least one of the plurality of devices in the home system comprises causing, when it is determined that a current context of a user of the mobile terminal are the same as the recorded context, and that the gesture command associated with the recorded patterns of the user of the mobile terminal, execution of an action associated with the gesture command of the user of the mobile terminal.

14. The apparatus of claim 13, wherein, the controller upon detecting the repeated context of the user of the mobile terminal as walking up a walk way to a home of the user, stepping up several steps and pausing at a top of the several steps, controls at least one of the plurality of devices based on the user's confirming of the action is an automatic opening of a door of the user's home by a home system in communication with the mobile device.

15. A non-transitory computer-readable storage medium storing instructions that, when executed, cause at least one processor to perform the method of claim 1.

* * * * *